United States Patent [19]
Larson

[11] 3,781,535
[45] Dec. 25, 1973

[54] PHOTOGRAPHIC REFLECTING DEVICE
[76] Inventor: Raymond George Larson, 1511 Cranbrook, Lawndale, Calif.
[22] Filed: Sept. 17, 1971
[21] Appl. No.: 181,298

[52] U.S. Cl. .................................. 240/1.3, 95/86
[51] Int. Cl. ................................. G03b 15/02
[58] Field of Search ..................... 240/1.3, 2 C; 95/11 L, 86

[56] References Cited
UNITED STATES PATENTS
| | | | |
|---|---|---|---|
| 2,479,716 | 8/1949 | Bensen | 95/86 X |
| 2,652,220 | 9/1953 | Nocht | 95/86 X |
| 3,550,519 | 12/1970 | Lewis | 95/86 |
| 3,575,098 | 4/1971 | Jones | 95/86 |
| 3,075,069 | 1/1963 | Spadaro | 240/1.3 |
| 2,965,747 | 12/1960 | Secofsky | 240/1.3 |
| 2,205,860 | 6/1940 | Olds | 240/1.3 |

*Primary Examiner*—Fred L. Braun
*Attorney*—Thomas P. Mahoney et al.

[57] ABSTRACT

A universal camera attachment for supporting a reflector member and in an exemplary embodiment a light source in a manner that permits the photographer to properly illuminate the subject matter without interfering with his manipulation of the camera and without hindering his freedom of movement. The salient attributes of the invention are obtained by permitting support of the reflector in a position upward and rearward of the camera with which the invention is utilized.

6 Claims, 5 Drawing Figures

PATENTED DEC 25 1973 3,781,535

INVENTOR.
RAYMOND GEORGE LARSON
BY MAHONEY, HORNBAKER
AND SCHICK
ATTORNEYS

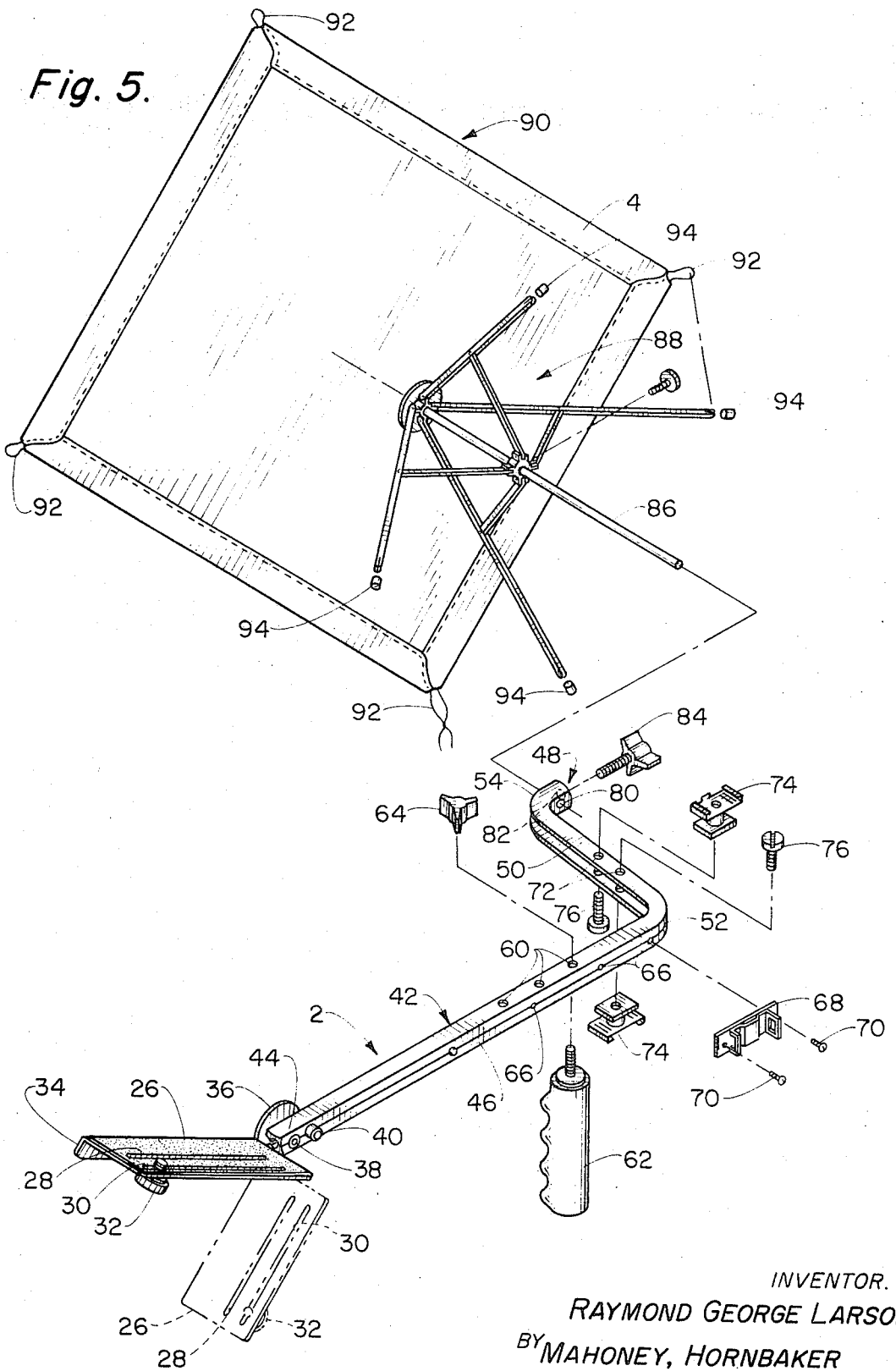

PHOTOGRAPHIC REFLECTING DEVICE

BACKGROUND OF THE INVENTION

Commercial photographers, as well as more serious-minded camera buffs, often require particular lighting requirements and a means of obtaining proper lighting, while not interfering with the ease of handling the camera and not interfering with the photographer's field of vision of the subject.

The need for lighting control and the need to direct illumination in a controllable manner consistent with mobility and portability, are desiderata for which most photographers strive.

Recently, there has been developed a unique type of reflector for use with cameras which is highly efficient, portable and versatile with respect to uses to which it may be put. The type of reflector particularly useful with the herein disclosed invention is the fabric umbrella-like one disclosed and claimed in U.S. Pat. No. 3,077,041 which generally is disclosed in said patent as having its own support stand or structure.

While such reflectors have been particularly useful in photographer's studios and the like wherein sophisticated lighting equipment is available, a need has arisen to provide the same type and quality of reflector for use in conjunction with portable lighting equipment such as electronic flash, Strobe and similar sources of illumination.

The herein disclosed invention allows for the use of reflectors of any type but more specifically, of the umbrella-like, folding variety as disclosed in said aforecited patent in conjunction with portable lighting equipment. It is made relatively easy to use and is fixedly mounted to a camera with which the equipment is used in a manner that permits ease of manipulation of the camera while providing adequate light intensities desired by the photographer.

OBJECTS AND SUMMARY OF THE INVENTION

It is an object of this invention to provide a reflector system for use in conjunction with a camera.

It is another object of the invention to provide an attachment for a camera which is versatile in nature and can be adapted to various uses.

It is still another object of the invention to provide a reflector system attachment for use with a camera wherein the reflector is supported in a position upward and rearward of the photographer using the camera.

It is still another and more specific object of the invention to provide an attachment for a camera which is easily associated with the camera and wherein the attachment is adapted to mount a collapsible folding reflector and to support the opened reflector in a position that allows ease of movement of a photographer using the camera with which the attachment is used.

It is still an even more specific and further object of the invention to provide an attachment for a camera wherein a mounting plate is adapted to receive a camera in secured relationship and is positionable in one of a plurality of positions and wherein an extending member having a supporting means by which the attachment and camera combination is easily supported, supports a reflector in an upward and rearwardly located position with respect to the camera.

It is still an even more and further specific object of the invention to provide an attachment for the camera which primarily supports a reflector member, which reflector member preferably is of the folding umbrella-like type and wherein the attachment is provided with a demountable supporting handle which may be positioned in one of a plurality of positions and wherein the main supporting member is provided with supporting means whereby light sources may also be supported from the attachment.

These and further objects of the invention will become apparent from the following commentary taken in conjunction with the drawings.

Basically, in an exemplary embodiment the invention is directed to an illumination attachment for cameras comprising the combination of a camera receiving member adapted to mount a camera in secured relationship therewith. An elongate member has one end operatively secured to the camera receiving member and has the other end extending upwardly and rearwardly of the camera receiving member. Said other end of the elongate member is adapted to mount a light reflector in operatively secured relationship rearwardly of said other end of said elongate member.

BRIEF DESCRIPTION OF THE DRAWING

FIG. 5 illustrates the salient components of the invention in exploded form in association with a specific type of collapsible, umbrella-like reflector.

Figure 1:
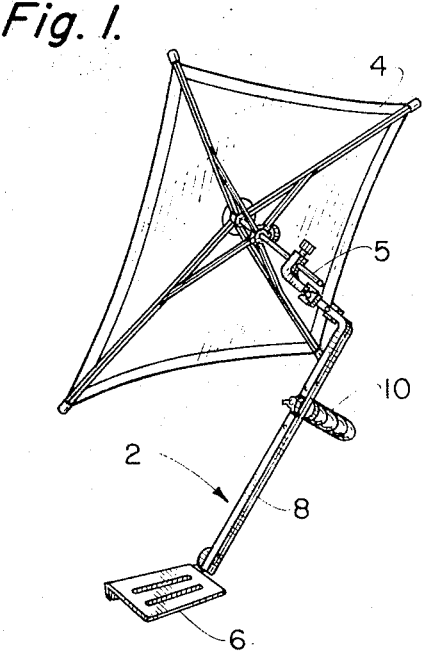
FIG. 1 is a schematic perspective view of the basic structure of this invention illustrating, in combination therewith, one type of reflector with which the attachment may be used.

DESCRIPTION OF THE BEST EMBODIMENTS CONTEMPLATED:

Referring to the drawings wherein like numerals of reference designate like elements throughout, the basic structure of the invention is shown in FIG. 1 wherein the attachment 2 is associated with a collapsible umbrella-like reflector member 4 having a shaft or rod 5 by which means it is secured to attachment 2.

Basically, attachment 2 comprises, and as more fully detailed hereinafter, a camera receiving plate or member 6 adapted to mount a camera thereon. An elongate member 8 has one end pivotally or swivelably secured to plate 6 while the other end is adapted to receive and mount the supporting shaft 5 of reflector member 4. Intermediate the ends of elongate member 8 is a supporting means or handle 10 which allows for ease of manipulability and support of the attachment 2 when it is associated with a camera and reflector as will now be described.

Figure 2:
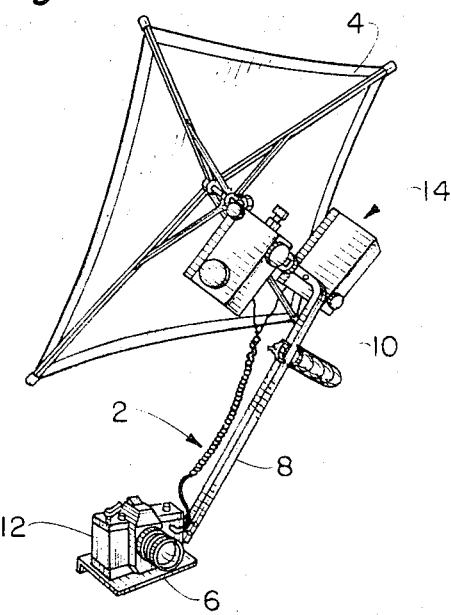
FIG. 2 illustrates the versatility of the invention showing the mounting of a camera and light source with which the invention is used.

Referring to FIG. 2, it will be noted that the camera receiving or mounting plate 6 has a camera 12 mounted thereon in rigid relationship. Elongate member 8 is adapted to receive, in mounted relationship, associated light and energy source 14 mounted in parallel relationship to member 8 and herein taking the form of an electronic flash. It should be noted that the light from light source 14 is directed to or towards the reflector member 4 and more specifically the reflective surface thereof. It is the reflected light from the reflector 4 which illuminates the subject of which the photograph is to be taken by means of camera 12.

Figure 3:
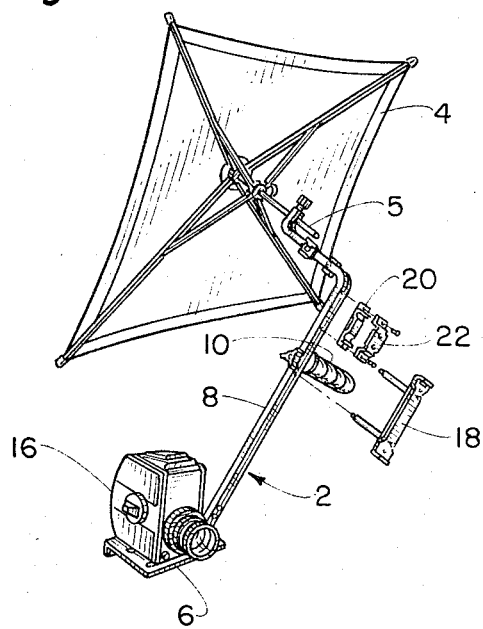
FIG. 3 schematically illustrates still another embodiment of the invention showing mounting brackets for various light sources in the exploded position.
Figure 4:
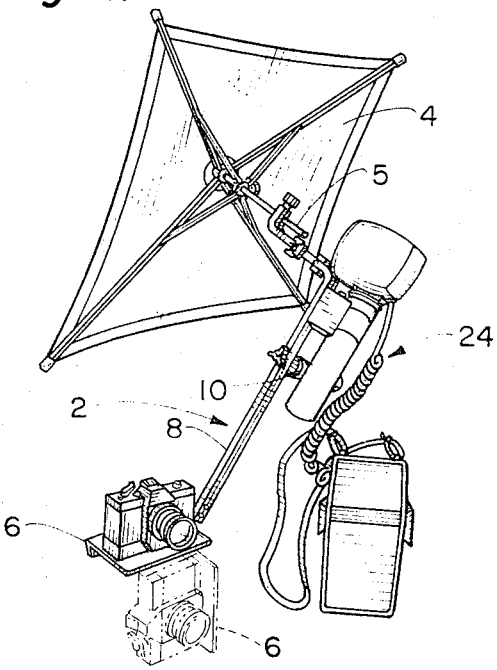
FIG. 4 illustrates the invention wherein a particular light source is mounted in association with the invention.

Referring now to FIGS. 3 and 4, the camera receiving plate 6 is of a design so as to mount various types of cameras such as, for example, the camera 16 and, in this instance, the member 8 is provided with associated, detachably mounted support means 18 and either clip 20 or 22 depending upon the members which it is desired to attach or mount on the device 2.

FIG. 4 illustrates a specific type of illuminating device-strobe 24 (here shown with the energizing cell) and illustrates the swiveable nature of camera receiving member or plate 6 such that it may be positioned in either a horizontal or vertical plane with respect to the photographer.

The foregoing is but a cursory disclosure to illustrate the versatility of the reflector support system of this invention and the universal application to which it readily lends itself. The major components of the device of this invention will now be disclosed in details and the various functions thereof described or as will become apparent as the commentary proceeds herein.

Of utmost importance is the fact that the attachment permits the photographer to support the cameras, light source and light reflector in one hand with the light source and reflector automatically oriented in the most effective position by the manipulation of the camera.

Also significant is the manner in which a wide variety of cameras and light sources may be utilized in conjunction with one another and partially supported by the shoulder of the photographer with the light source and reflector disposed rearwardly of the photographer.

Referring now to FIG. 5 an exemplary basic embodiment of the device 2 is illustrated as having a camera receiving member 26 here taking the form of a plate having spaced slots 28 and 30 with the slot 30 having a captive and associated thumb screw 32 of a size which is uniformly accommodated by camera cases and the like. The upper surface of plate 26 is substantially planar and may be provided with a layer or covering of a non-skid type material having a high coefficient of friction so that relative movement of the secured camera and the device 2 is kept to a minimum.

The camera receiving member 26 is provided with a depending lip-like portion 54 which extends beyond the planar surface formed by the plate and terminates in annular portion 36 by which means, through rivet 38, it is swivelably secured to the remainder of the device. Annular portion 36 is provided with two spaced holes (not shown) to act with the spring biased ball or detent member 40 to allow rigid positioning in either one of two positions as shown in the full line or dotted line. Thus, the dotted line position is achieved merely by pressing in on the ball of the detent assembly 40 and rotating the camera receiving member 26 downward into the dotted line position until the ball detent drops into position formed by the other hole in annular portion 36.

Elongate member 42 is of light weight construction such as aluminum and of channel-like configuration having a connecting transverse web with end 44 pivotally and swivelably secured to annular portion 36 of camera receiving member 26 and having an extending linear portion 46 and a reflector supporting end 48. Intermediate the ends 44 and 48 is an offset extending portion 50 lying substantially in the same plane as linear portion 46. It will be noted that the member 42 is of integral construction having two curvilinear sections 52 and 54 by which means the reflector 4 is supported rearward of camera receiving plate 26. The axis of the reflector supporting end 48 lies in a plane spaced from and about parallel with the longitudinal axis of the end 44 of member 42.

The camera receiving plate 26 shown in full line forms a horizontal surface or plane and the linear portion 46 is positionable into a position above said plane or below said plane as shown in phantom lines thereby forming an acute angle in either position. It will be noted that the linear portion 46 extends upwardly from the horizontal plane formed by plate 26 while the offset portion 50 lies in a plane with respect to the axis of said linear portion that is askew thereto. At the same time, the reflector supporting end 48 is about normal to the plane of the offset extending portion 50 (see FIG. 1). Obviously, the foregoing limitations are not critical except that it is necessary that the criterion of supporting the reflector 4 upward and rearward of the photographer be followed.

In order to properly support associated camera and reflector, the device 2 and specifically linear portion 46 is provided with a plurality of spaced through holes or apertures 60 by which means a handle 62 may be selectively positioned as by means of thumb nut 64 in a position that best suits the individual comfort of the photographer using the device 2. Linear portion 46 is also provided with a plurality of spaced holes in the transverse web section as, for example, 66 by which means light mounting brackets may be supported, one such bracket 68 with associated screws 70 being shown. The bracket 68 may be of a type to mount any one of the conventional sources of illumination.

Likewise, the offset extending portion 50 is provided with spaced through holes 72 so as to accommodate mounting brackets 74 and associated bolts 76. Obviously, the placement of the mounting holes as well as the specific configuration of the brackets are matters of choice depending upon the particular source of illumination which is to be used with the device 2. Suffice to say that the device 2 is provided with associated brackets and mounting members to accommodate and receive various light sources some of which have been earlier described.

The end 48 is provided with through hole 80 of sufficient diameter to accommodate the supporting shaft of a reflector or the like as will be described. A threaded throughhole 82 is provided within which thumb screw member 84 may be threaded in order to rigidly secure the shaft 86 supporting the collapsible, umbrella-like structure generally designated 88 of reflector 4.

In this particular instance, reflector 4 is of the collapsible-type employing a fabric member 90 having different reflective surfaces on either side thereof and which is held to the support umbrella structure 88 by means of the string 92 and friction tips 94.

Obviously other reflectors may be associates with the devices 2 of this invention other than that described herein for illustrative purposes. Such modification will make itself apparent to those of ordinary skill in the art.

It should now be obvious that a light-weight, universal and versatile camera attachment has been disclosed which is portable in nature and which lends itself to easy adaptation for various end uses and which can be easily disassembled into a compact package for ease of carrying or storage.

I claim:

1. A portable illuminator attachment for cameras comprising the combination of: a camera-supporting member for demountably mounting a camera in secure relationship, an elongate member one end of which is pivotally connected to said camera supporting member and the other end of which extends in a direction upward and rearward of said camera-supporting member when the latter is supporting a camera in picture-taking position, means on said other end for mounting a light reflector behind a person holding said attachment in picture-taking position with the reflector facing the subject, means on said elongate member for mounting light means in front of said reflector in such manner that the light emitted by said light means is directed toward said reflector and reflected thereby so that only indirect light from said attachment impinges on the subject, and means for hand-supporting said attachment by said person.

2. The attachment in accordance with claim 1 wherein said camera-supporting member comprises a mounting plate adapted to position a camera in a selected one of a plurality of positions.

3. The attachment in accordance with claim 2 wherein said hand-supporting means is positioned intermediate said one and said other end of said elongate member.

4. The attachment in accordance with claim 3 wherein said elongate member is adapted to receive said hand supporting means in a selected one of a plurality of positions and said hand supporting means is demountable.

5. The attachment in accordance with claim 1 wherein said members are of light-weight metal and said light mounting means are demountable from said elongate member and said hand-supporting means is a handle member secured in selected ones of a plurality of longitudinally spaced holes provided in said elongate member.

6. A portable illumination attachment in accordance with claim 1 in which said elongate member is pivotally connected to said camera-supporting member by means of a pivot member connecting said one end of said elongate member to a plate forming an integral part of said camera-supporting member, spaced holes in said plate, a spring-biased ball member located on said elongate member at a point adapted to align with said plate holes when said elongate member is swiveled, said ball member engaging said plate to act as a detent to hold the supporting member and elongate member in fixed relationship when a plate hole and ball member are in alignment.

* * * * *